United States Patent
Obermeyer et al.

(10) Patent No.: US 11,901,713 B2
(45) Date of Patent: Feb. 13, 2024

(54) SYSTEM FOR REGULATING THE TEMPERATURE OF CABLES

(71) Applicant: RWE Renewables GmbH, Essen (DE)

(72) Inventors: Sebastian Obermeyer, Hamburg (DE); Stefan Dominguez Ebitsch, Hamburg (DE); Christian Schiller, Hamburg (DE)

(73) Assignee: RWE Renewables GmbH, Essen (DE)

( * ) Notice: Subject to any disclaimer, the term of this patent is extended or adjusted under 35 U.S.C. 154(b) by 0 days.

(21) Appl. No.: 17/912,148

(22) PCT Filed: Feb. 5, 2021

(86) PCT No.: PCT/EP2021/052811
§ 371 (c)(1),
(2) Date: Sep. 16, 2022

(87) PCT Pub. No.: WO2021/185511
PCT Pub. Date: Sep. 23, 2021

(65) Prior Publication Data
US 2023/0144999 A1    May 11, 2023

(30) Foreign Application Priority Data
Mar. 17, 2020    (DE) ..................... 10 2020 107 254.6

(51) Int. Cl.
*H02G 3/00*    (2006.01)
*H02G 3/03*    (2006.01)
(Continued)

(52) U.S. Cl.
CPC .................. *H02G 3/03* (2013.01); *H02G 9/02* (2013.01); *H02G 9/06* (2013.01)

(58) Field of Classification Search
CPC ............... H02G 3/03; H02G 9/02; H02G 9/06
See application file for complete search history.

(56) References Cited

U.S. PATENT DOCUMENTS

| | | | |
|---|---|---|---|
| 3,962,529 A | 6/1976 | Kubo | |
| 2011/0248503 A1* | 10/2011 | Ventz | F03B 13/18 60/497 |

(Continued)

FOREIGN PATENT DOCUMENTS

| | | |
|---|---|---|
| DE | 102008009453 A1 | 8/2009 |
| DE | 102014206000 A1 | 10/2015 |

(Continued)

OTHER PUBLICATIONS

JP 2018022563 A English Translation (Year: 2018).*
JPH 0458712A Ant proof device for submarine cable; English Translation; published in Feb. 25, 1992 (Year: 1992).*

*Primary Examiner* — Pete T Lee
(74) *Attorney, Agent, or Firm* — The Webb Law Firm

(57) ABSTRACT

In particular, the invention relates to a system for regulating the temperature of a cable which is laid at least partly in a body of water and on land, said system including: means for collecting water on the land-side such that water can be collected into said means and can be dispensed out of said means; means for controlling a quantity of water such that a quantity of water flowing out of the means for collecting water on the land-side or flowing into said means from the body of water can be controlled; and means for cooling a cable, said means surrounding the cable in the form of a sleeve in at least one section of the means for collecting water on the land-side up to a body of water, wherein a cavity through which the water flows in order to cool the cable is formed between the cable and the means for cooling the cable. The invention additionally relates to the use of a system according to the invention.

10 Claims, 1 Drawing Sheet

(51) Int. Cl.
*H02G 9/02* (2006.01)
*H02G 9/06* (2006.01)

(56) References Cited

U.S. PATENT DOCUMENTS

| | | | |
|---|---|---|---|
| 2012/0061973 A1* | 3/2012 | Zelony | ............... F03D 9/17 |
| | | | 290/1 R |
| 2016/0225489 A1* | 8/2016 | Willemoës | ............ D07B 1/147 |
| 2017/0077687 A1 | 3/2017 | Soerensen | |
| 2020/0032474 A1* | 1/2020 | Soerensen | ............ E02B 17/027 |

FOREIGN PATENT DOCUMENTS

| | | |
|---|---|---|
| DE | 102013022347 B3 | 1/2019 |
| EP | 3672000 A1 | 6/2020 |
| JP | H458712 A | 2/1992 |
| JP | 201822563 A | 2/2018 |
| WO | 2019203650 A1 | 10/2019 |

\* cited by examiner

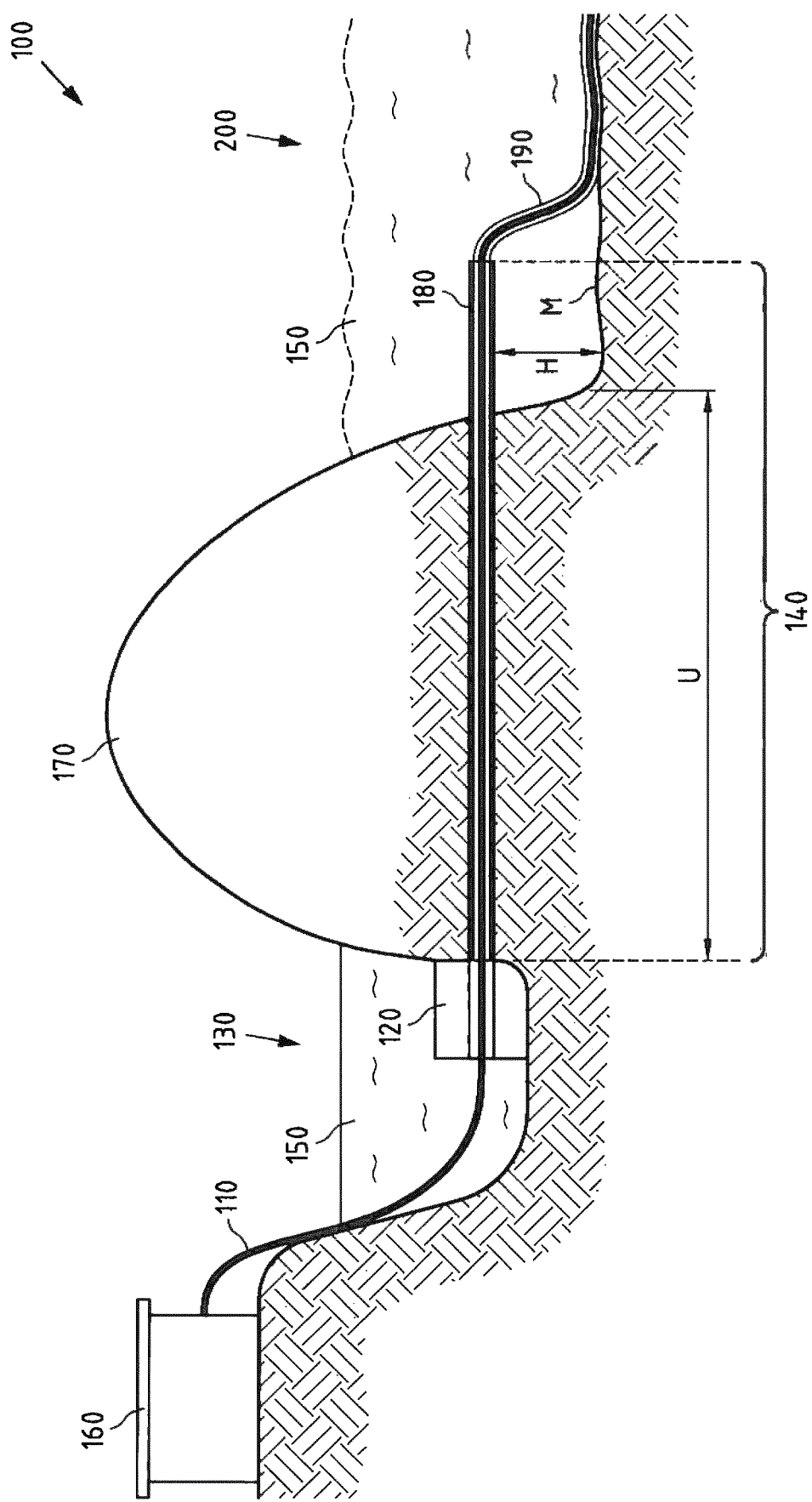

SYSTEM FOR REGULATING THE TEMPERATURE OF CABLES

CROSS-REFERENCE TO RELATED APPLICATIONS

This application is the United States national phase of International Application No. PCT/EP2021/052811 filed Feb. 5, 2021, and claims priority to German Patent Application No. 10 2020 107 254.6 filed Mar. 17, 2020, the disclosures of which are hereby incorporated by reference in their entirety.

BACKGROUND OF THE INVENTION

Field of the Invention

The invention relates to a system for regulating the temperature regulation of cables, in particular for offshore wind turbines and/or offshore wind farms.

Description of Related Art

Offshore wind turbines and/or offshore wind farms are usually connected to the mainland via one or more cables, so-called export cables. One of the most critical points in the route from an offshore wind turbine and/or an offshore wind farm to the transfer station (e.g. transformer station or transformer) on land is the transition from a body of water (e.g. sea) to the land. The cable(s) are subject to high thermal loads here. Often this quite short area (about several 100 m long) is the thermal and current bottleneck for an export cable, which can be several 10 km long in total. To better dissipate the heat of the export cable, some kind of concrete mix is often used to encase the cable. However, this involves many uncertainties, such as whether the cable is really completely encased. In addition, it is difficult or impossible for the concrete manufacturer or the cable manufacturer to take technical responsibility for this design, e.g. in the event of a fault.

SUMMARY OF THE INVENTION

It would be desirable to be able to provide a solution to minimize or avoid the aforementioned problems, and in particular to be able to improve the high thermal load at the transition from a body of water to the land of such cables.

Against the background of the described prior art, the present object is to at least partially reduce or avoid the described problems, i.e. in particular to provide a possibility to be able to improve the thermally high load at the transition from a body of water to the land of such cables.

This object is solved by a system according to a first aspect having the features as described herein. The present object is further solved by a use according to a second aspect, wherein the use claims a present system according to the first aspect for connecting at least one offshore wind turbine.

In the following, some exemplary embodiments are described in more detail according to all aspects:

In particular, an offshore structure is connected by means of the cable. An offshore structure is, for example, a wind turbine installed offshore (e.g. in the sea) and/or a wind farm installed offshore. Such a wind farm comprises, for example, several wind turbines.

The cable is in particular a so-called export cable. By means of such a cable or export cable, for example, the collected generated energy of a wind turbine or a wind farm installed offshore is conducted to the transfer station (e.g. transformer station). Such a cable comprises, for example, an aluminum core. Such a cable may be several km long, e.g. 50, 100, 150 km, or more. For example, such a cable is designed for a maximum transmission power of 75% of the total power of the wind turbine or wind farm connected to the cable. This also makes it possible, for example, to use reserves or, in the event of technical defects, reserves in one or more further cables of this type. In particular, the cable is a high-voltage direct current transmission cable (HVDC cable) for transporting electrical energy generated by a power generation plant (e.g. wind turbine) to a consumer.

The present object is based on the realization that, in order to make a so-called landfall, i.e. the transition of a cable from a body of water (e.g. the sea, a river or a lake) to the land, less critical, water from the body of water can be selectively led from the body of water past the cable to regulate its temperature, collected and optionally returned in a controlled manner. In this way, the system according to the first aspect can thus be used for regulating the temperature of a cable laid at least partially from a body of water (e.g. the sea) to the land. The cable is, for example, a standard submarine cable, which is constructed in such a way that the cable can be permanently in contact with water at its outer sheath without its function being impaired.

A body of water is understood to mean, in particular, flowing or standing water that is integrated into the natural water cycle. A body of water is, for example, the sea, a stream, a river, a lake or a reservoir, to name just a few non-limiting examples.

The system includes means for collecting water on the land-side so that water can be collected in and discharged from these means. This is, for example, a water collection or catch basin located on the land or on the land-side. Water or seawater flows past the outer surface, for example a sheath of the cable, for regulating the temperature of the cable, in particular for its cooling. On the one hand, the water flows from the body of water into the means for collecting water on the land-side, e.g. into a corresponding water collection basin. On the other hand, the water (e.g. seawater) in the means (e.g. water collection basin) for collecting water on the land-side can flow (back) into the body of water while e.g. cooling the cable.

The system further comprises means for controlling a quantity of water such that an amount of water flowing out of or into the means for collecting water on the land-side is controllable. For example, the means for controlling a quantity of water is a quantity control of water flowing from the water body into the land-side water collection means, and optionally back from the land-side water collection means into the water body.

The system further comprises means for cooling a cable which encase the cable in the form of a sleeve at least in a section from the means for collecting water on the land-side into the body of water, wherein a cavity is formed between the cable and the means for cooling the cable through which the water flows.

Encasing the cable the form of a sleeve means in particular that the cable is arranged inside a tube. The cable lies freely in the tube, for example. The cable is not fixed inside the tube, for example.

In the event that the means for cooling the cable is or comprises a pipe or tube, the water may flow from the body of water into the means for collecting water on the land-side, and optionally back into the body of water, in a space formed between the inner wall of the pipe and an outer surface (e.g. sheath) of the cable.

In this way, it is possible to counteract the general problem that occurs when connecting, for example, an offshore wind farm to a transfer station installed on land (e.g. transformer station, to name just one non-limiting example), so that a thermal bottleneck that sometimes occurs at the transition from water to land can be effectively eliminated. The cable is only thermally resilient to a certain degree, which means that such thermal bottlenecks can occur. This particularly affects the transition where the (e.g. sea) cable is transferred to land. The water of the body of water is efficiently used by means of the present system to regulate the temperature at the transition from the body of water to the land. Furthermore, it is possible in this way to completely save, for example, concrete with which such a cable can be encased in order to reduce the thermal load on the cable at the transition from land to water.

In an exemplary embodiment of the subject matter according to all aspects, the system further comprises:

means for guiding the cable such that the cable is placed in a guided-manner inside the means for guiding the cable.

The means for guiding the cable guide the cable in a rigid, i.e. predetermined manner. Alternatively, the means for guiding the cable guide it in a variable manner, whereby in the latter case the means for guiding the cable are at least partially flexible.

In an exemplary embodiment of the subject-matter according to all aspects, the means for guiding the cable comprise a cable protection system such that the cable is guided from a land exit point onto a bottom of the water body.

The cable protection system ensures in particular that a mechanical load on the cable in the area, e.g. a bending of the cable, does not lead to defects in the cable. Such an area in which the cable is bent is, for example, from an exit point of the cable into a body of water, where the cable is subsequently guided onto a bottom of the body of water.

For example, the cable must be guided safely from the point of exit from the land into the body of water (e.g. the sea) to the ground (e.g. the seabed) so that it can be laid down there. In order to control the mechanical load on the cable in particular, the cable can, for example, additionally be provided in this area with means for guiding the cable to the ground. The means for guiding the cable, for example, is a tube bent at least partially in the transition area from an exit point from the land towards the ground. Alternatively or additionally, a kind of scaffolding can be used on which the cable can be placed and guided to the ground in a controlled manner by means of holders for the cable arranged at different heights on the scaffolding.

For example, in addition to guiding the cable, e.g. in a controlled manner, from an exit point of the cable into the body of water (e.g. sea) to the bottom of the body of water (e.g. seabed), the cable protection system enables further features which are particularly aimed at increasing the longevity of the cable. Such a cable protection system may have one or more of the features listed below, with which the cable can be provided, at least in a section where the cable protection system is arranged:

Increase the corrosion resistance of the cable;
Increase the temperature resistance of the cable;

Increasing the mechanical strength of the cable (e.g. impact-absorbing effect and/or protecting against abrasion due to external mechanical impact on the cable); and Enabling vibration damping of the cable, to name just a few non-limiting examples.

In an exemplary embodiment of the subject-matter according to all aspects, the means for cooling the cable comprises a tube such that the cable is placed within the tube.

The export cables are usually pulled through a tube. This tube is inserted into the ground via a horizontal drilling process from the land-side to the sea-side.

The tube is, for example, a so-called HDD (Horizontal Directional Drilling) tube. The tube is laid, for example, by means of a horizontal directional drilling method (also referred to as HDD), so that the cable can then be pulled into the laid tube. For example, a tube will be drilled through the earth from land to water in such a way that the land end of the tube is always below the water level of the body of water (e.g. sea level). This enables a further technical effect, according to which a risk of sinking from such a tube is reduced on its water-side opening, so that water can pass through the sheath-like casing of the cable for regulating the temperature of the cable.

For example, at high tide or flood, the water flows through the tube laid by the horizontal directional drilling method towards the means for collecting water on land (e.g. a natural or man-made water collection basin). At low tide or ebb, the water may flow back into the water body (e.g. sea). Using the means to control the quantity of water, the amount of return flow can be regulated or controlled, for example. This has a cooling effect on the cable in particular and thus its thermal load.

In an exemplary embodiment of the subject-matter according to all aspects, the tube is double walled so that the water flows in a cavity formed between the double-wall.

If the tube, which encases the cable like a shell at least in the area of the transition from the means for collecting water on the land-side into the body of water, is double-walled at least in this area, the water does not come into direct contact with the water, as the water flows or flows within the intermediate space formed in the double-wall of the tube. This can have a positive effect on the durability or longevity of the cable, but is sometimes accompanied by a slightly reduced thermal effect, e.g. the cooling of the cable by the water. This is due to the fact that air chambers can form between the cable and the water, and air can only transfer the heat of the cable to the water to a small extent in the manner of a heat exchanger.

In an exemplary embodiment of the object according to all aspects, the land-side outlet of the cable is below the lowest possible water level of the water body.

This is particularly relevant when the body of water is the sea and the water level, i.e. sea level, sinks and rises again due to the ebb and flow of the tide.

As a result, the water-side outlet of the cable is also higher than the land-side outlet, so that the risk of the tube through which the cable is routed silting up is reduced or silting up is avoided.

To allow the cable to emerge from the ground on land below the water level in this way, either a given natural topology of the environment is to be used or the means for collecting water on the land-side are to be artificially introduced into the ground, for example as one or more water collection basins, so that the water can be collected in this or these.

In an exemplary embodiment of the subject matter according to all aspects, the system further comprises:

a transfer station (e.g. comprising a transformer) arranged on the land-side, the cable being led from the means for collecting water on the land-side to the transfer station.

The transfer station is, for example, a transformer station by means of which the electrical energy generated by a wind turbine or wind farm connected to the cable can be transported to the consumer by means of an electricity distribution network. The generated electrical energy is converted, for example, from direct current to alternating current or three-phase current. Furthermore, the generated electrical energy is transformable to a voltage level used by the distribution network (e.g. 10/20 kV, or 400 V, to name just a few non-limiting examples).

In an exemplary embodiment of the subject-matter according to all aspects, the means for controlling a quantity of water comprises a valve. Alternatively, a pump may be used to control the quantity of water. In the latter case, the means for controlling a quantity of water accordingly comprise a pump, by means of which in particular water can be pumped from the means for collecting water on the land-side back into the body of water.

Optionally, the system also includes such a valve and/or pump on the water side (e.g. lake/sea side) of the cable.

The valve and/or the pump are thus arranged (e.g. installed) on the land-side. By means of the valve and/or the pump, it is possible, for example, to control a backflow quantity of water. The same applies to an optional valve and/or pump that can be arranged (e.g. installed) on the water-side at the point where the cable enters the water from the land. In the event that a valve or a pump, or a combination of valve and pump, or both valve and pump are arranged on the land-side as well as on the water-side, extremely precise control of the flow rate of water and thus temperature regulation of the cable in the transition from the water to the land of the cable can be achieved.

In an exemplary embodiment of the subject matter according to all aspects, the means for controlling a quantity of water is put into a maintenance mode so that the cable is removable from the means for cooling the cable.

The means for controlling a quantity of water, e.g. comprising a valve and/or a pump, shall be operable, e.g. in the case of a valve, to be openable in order, in the event of failure of the cable (e.g. if the cable is defective), to be able to remove (e.g. pull out) it from an envelope-like sheath (e.g. a (HDD) tube) of the cable comprised by the means for cooling the cable. Subsequently, a fault-free, repaired or new cable can be retracted into the means for cooling the cable, e.g. comprising a tube, or a corresponding cable can be retracted into the sheath-like casing.

As already disclosed above, the cable does not have to be encased in concrete for cooling. In the event of a fault, the cable is much easier to repair and the maintenance of the cable, which is sometimes necessary, is also much simpler, as the concrete can be dispensed with and the thermal efficiency is still guaranteed.

In an exemplary embodiment of the subject matter according to all aspects, the system further comprises:

further means for cooling a further cable, which encase a further cable in the manner of a sheath at least in a section from the means for collecting water on the land-side into the body of water, wherein a cavity is formed between the further cable and the means for cooling the further cable, through which cavity the water flows.

Several cables can end in the means for collecting water on the land-side, so that several cables can be regulated in terms of temperature, especially in their respective transition from land to water. The means for collecting water on land comprise a larger capacity in the case of several (i.e. at least two) cables led into them, so that the quantity of water is sufficient for cooling the cables. Accordingly, the system may in particular comprise multiple (i.e. at least two) means for regulating the temperature (e.g. cooling) of cables.

The further means for cooling a further cable can be designed in an analogous manner to the means for cooling the cable and/or comprise or have the same features.

In an exemplary embodiment of the subject matter according to all aspects, the cable and/or the further cable each transport electrical energy generated by a wind turbine or a wind farm comprising a plurality (i.e. at least two) of wind turbines.

In an exemplary embodiment of the subject matter according to all aspects, the means for collecting water on land comprises a natural water reservoir, or a man-made water reservoir.

As already disclosed above, the means for collecting water on the land-side are or comprise, for example, a collecting basin for water. This must be dimensioned according to the number of cables to be temperature-regulated (e.g. cooled). In the event that, for example, six cables are to be cooled, a corresponding collecting basin must therefore be relatively large, since the cables are, for example, each guided in a tube from a wind turbine or wind farm connected to the cable on land to the means for collecting water on the land-side. For example, the means for collecting water on the land-side must have at least the capacity of the volumes of the means for regulating the temperature of a cable (e.g. its envelope-like sheathing, the form of a sleeve) ending in these means, in order to be able to safely cool all the cables located therein, for example.

In an exemplary embodiment of the subject-matter according to all aspects, the sea represents the body of water, and during high tide water flows from the sea through the means for cooling the cable into the means for collecting water on land, and during low tide the water from these flows back into the sea.

The flow of water can also flow from the body of water (e.g. sea) through the means for cooling the cable to the means for collecting water on the land-side during high tide and back to the body of water during low tide. By means of a pump and/or a valve, the amount of water flowing can be controlled and/or regulated, i.e. increased or decreased.

The exemplary embodiments of the present invention previously disclosed in this description are also to be understood as disclosed in all combinations with each other. In particular, exemplary embodiments are to be understood as disclosed with respect to the various aspects.

In particular, the preceding or following description of method steps according to preferred embodiments of a method is also intended to disclose corresponding means for carrying out the process steps by preferred embodiments of an apparatus. Likewise, the disclosure of means of an apparatus for carrying out a method step is also intended to disclose the corresponding method step.

Further advantageous exemplary embodiments of the invention can be found in the following detailed description of some exemplary embodiments of the present invention, in particular in connection with the figures. However, the figures are intended only for the purpose of clarification and not for determining the scope of protection of the invention. The figures are not to scale and are only intended to reflect the general concept of the present invention by way of example. In particular, features included in the figures are in no way to be considered as a necessary part of the present invention.

BRIEF DESCRIPTION OF THE DRAWING

FIG. 1 shows a schematic representation of a system.

DETAILED DESCRIPTION OF THE PREFERRED EMBODIMENTS

Referring to FIG. 1, a system 100 is designed and/or arranged for regulating a temperature of a cable 110 laid at least partially in the transition U from land to water (here the sea). The system 100 comprises means 130 for collecting water on the land-side, such that water 150 is collected in said means 130 and is dispensable from said means 130. The system 100 further comprises means 120 for controlling a quantity of water, such that a quantity of water 150 flowing out of or into the means 130 for collecting water on the land-side is controllable. Further, the system 100 comprises means 140 for cooling a cable, in particular for cooling the cable 110, which encases the cable 110 in a form of a sleeve at least in a section from the means 130 for collecting water on the land-side to the sea. A cavity is formed between the cable 110 and the means 140 for cooling the cable, through which the water 150 flows. The system further comprises a transfer station 160 to which one end of the cable 110 is connected. Not shown in FIG. 1 is that the other end of the cable 110 is connected to an offshore wind turbine, or an offshore wind farm, so that electrical energy generated by the offshore wind turbine or the offshore wind farm can be transported to the transfer station (e.g. comprising a transformer) by means of the cable 110.

In the present case, the means 130 for collecting water on the land-side is a natural collecting basin for water 150, which is suitable for collecting at least the quantity of water 150 that is needed to be able to cool the cable 110 in the transition U from land, in this case the dune 170, to the sea.

The means 140 for cooling a cable, in this case cable 110, comprise a tube which is laid in the sea from the land using the HDD method, i.e. horizontal directional drilling method. The seaward exit of the cable 110 is not directly at the seabed MB, so that a height difference H must still be bridged in order to deposit the cable 110 in a controlled manner on the seabed MB, from where it extends to an offshore wind turbine or an offshore wind farm.

It can be seen that the sea side outlet of the cable 110 is higher than the outlet of the cable 110 within the natural catch basin 130. If the bore of the tube 180 were to rise from the sea-side to the land-side, the tube could at some point be free of water, so that sufficient cooling of the cable 110 in transition U can no longer be guaranteed.

At the exit point of the tube 180 into the means 130 for collecting water on the land-side, a valve is further arranged as means 120 for controlling a quantity of water 150 in order to be able to control and/or regulate the quantity of water 150 flowing through the tube 180 for cooling the cable 110. The sea-side outlet of the cable 110 is further below the lowest possible water level 200 (here: the sea level), so that it can be ensured that sea water can always flow or flow into the natural collection basin 130 at least from the sea.

Instead of concrete (or a type of concrete), with which the tube 180 could also be filled, it is intended to let the water 150 flow through the tube 180. Although concrete or different types of concrete have a better thermal conductivity than air, it is disadvantageous especially in case of maintenance or repair and the thermal conductivity of water is also better than that of air. Once the tube 180 is filled with concrete, the cable 110 cannot be easily removed from the tube 180. Often a new tube must be laid, e.g. using the HDD method, and a new cable 110 must be pulled into the newly laid tube.

If air is left in the tube 180, the thermal load of the cable 110 in transition U would be significantly increased, as air acts more as an insulator than, for example, concrete.

Exemplary embodiments according to all aspects make it possible that the exit point of the well or, in its wake, of the tube 180 on the land side, i.e. within the means for collecting water 130 on land, lies below sea level. Further, the cable 110 may exit, for example, in a controlled manner below the sea surface or at least below the maximum possible sea level.

Instead of the natural catch basin 130, a basin made of concrete can also be specially built so that the water 150 can flow into and out of the tube 180. The operating principle is identical.

The water 150 can flow or flow through the tube 180 for cooling the cable 110, for example, either only by the tides, i.e. ebb and flow through the tube 180. Alternatively or additionally, the water 150 may flow or flow through the tube 180 on the land-side, e.g. within the means for collecting water 130 on the land side, regulated by means of a valve and/or a pump. In the latter possibility, the water 150 may be selectively discharged, e.g. in certain situations, e.g. when increased cooling of the cable is required due to an increased amount of electrical energy to be transported by means of the cable 110, to give just one non-limiting example.

The embodiments of the present invention disclosed in this specification and the optional features and characteristics indicated in each case in this respect are also to be understood as disclosed in all combinations with each other. In particular, the description of a feature encompassed by an embodiment example—unless explicitly stated to the contrary—is not to be understood as meaning that the feature is indispensable or essential for the function of the embodiment example. The sequence of the method steps disclosed in this specification in the individual flowcharts is not mandatory; alternative sequences of the process steps are conceivable. The method steps can be implemented in various ways, such as implementation in software (by program instructions), hardware or a combination of both to implement the method steps.

Terms used in the patent claims such as "comprise", "have", "include", "contain" and the like do not exclude further elements or steps. The wording "at least in part" covers both the case "in part" and the case "in full". The phrase "and/or" is intended to be understood as disclosing both the alternative and the combination, i.e. "A and/or B" means "(A) or (B) or (A and B)". The use of the indefinite subject-matter does not exclude a plural. A single apparatus may perform the functions of a plurality of units or apparatuses mentioned in the claims. Reference signs indicated in the patent claims are not to be regarded as limitations of the means and steps employed.

LIST OF REFERENCE SIGNS

100 System
110 Cable
120 Means for controlling a quantity of water
130 Means for collecting water on the land-side
140 Means for cooling a cable 150 Water
160 Transfer station
170 Land (e.g. beach, dune, or the like)
180 HDD Tube
190 Cable protection system
200 maximum water level
U Transition land/water
H Height difference for guiding the cable to the bottom of the body of water
M Bottom of the body of water

The invention claimed is:

1. A system for regulating the temperature of a cable laid at least partly in the transition from land to a body of water, comprising:
    means for collecting water on the land-side, such that water can be collected into said means and dispensed out of said means;
    means for controlling a quantity of water such that a quantity of water flowing out of or into said means for collecting water on the land-side can be controlled; and
    means for cooling a cable, said means surrounded the cable in the form of a sleeve in at least one section of the means for collecting water on the land-side up to a body of water, wherein a cavity through which the water flows in order to cool the cable is formed between the cable and the means for cooling the cable,
    means for guiding the cable comprising a cable protection system comprising a tube such that the cable is placed in a guided-manner inside the tube and guided from a land exit point onto a bottom of the body of water, wherein,
    the means for collecting water on the land-side is at least one water collection or catch basin located on the land or the land-side,
    wherein the tube is bent at least partially in a transition area from the land exit point in a direction towards the bottom of the body of water, and
    wherein the sea represents the body of water, and during high tide water flows from the sea through the means for cooling the cable into the means for collecting water on the land-side, and during low tide the water from these flows back into the sea.

2. The system according to claim 1, wherein the tube is double-walled so that the water flows in a cavity formed between the double-wall.

3. The system according to claim 2, wherein the land-side outlet of the cable is below the lowest possible water level of the body of water.

4. The system according to claim 3, further comprising:
    a transfer station arranged on the land-side, the cable being led from the means for collecting water on the land-side to the transfer station.

5. The system according to claim 4, wherein the means for controlling a quantity of water comprise a valve.

6. The system according to claim 5, wherein the means for controlling a quantity of water is put in a maintenance mode so that the cable is removable from the means for guiding the cable.

7. The system according to claim 6, further comprising:
    a further cable, and
    a further means for cooling the further cable, which encase the further cable in the manner of a sheath at least in a section from the means for collecting water on the land-side into the body of water, wherein a cavity is formed between the further cable and the means for cooling the further cable, through which cavity the water flows.

8. The system according to claim 7, wherein the cable and/or the further cable each transport electrical energy generated by a wind turbine or a wind farm comprising a plurality of wind turbines.

9. The system according to claim 8, wherein the means for collecting water on the land-side comprise a natural water reservoir, or a man-made water reservoir.

10. A use of a system according to claim 1 for connecting at least one offshore wind turbine.

* * * * *